US009684600B2

(12) United States Patent
Kurtz et al.

(10) Patent No.: US 9,684,600 B2
(45) Date of Patent: Jun. 20, 2017

(54) DYNAMIC PROCESS/OBJECT SCOPED MEMORY AFFINITY ADJUSTER

(75) Inventors: Jay P. Kurtz, Rochester, MN (US); Glen W. Nelson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1129 days.

(21) Appl. No.: 13/307,512

(22) Filed: Nov. 30, 2011

(65) Prior Publication Data

US 2013/0138885 A1 May 30, 2013

(51) Int. Cl.
*G06F 12/00* (2006.01)
*G06F 12/084* (2016.01)
*G06F 12/0842* (2016.01)

(52) U.S. Cl.
CPC ........ *G06F 12/084* (2013.01); *G06F 12/0842* (2013.01)

(58) Field of Classification Search
None
See application file for complete search history.

(56) References Cited

U.S. PATENT DOCUMENTS

| | | | | |
|---|---|---|---|---|
| 5,025,365 A | * | 6/1991 | Mathur | G06F 12/0831 711/121 |
| 5,269,013 A | * | 12/1993 | Abramson | G06F 12/08 711/170 |
| 5,727,150 A | * | 3/1998 | Laudon | G06F 12/122 709/215 |
| 5,860,116 A | | 1/1999 | Washington | |

(Continued)

FOREIGN PATENT DOCUMENTS

| EP | 0848330 A2 * | 6/1998 |
|---|---|---|
| WO | 9635169 A1 | 11/1996 |

OTHER PUBLICATIONS

Mark S. Squillante, "Using Processor-Cache Affinity Information in Shared-Memory Multiprocessor Scheduling" Feb. 1993, IEEE Transactions on Parallel and Distributed Systems, vol. 4, No. 2. pp. 131-143.*

(Continued)

*Primary Examiner* — Pierre-Michel Bataille
(74) *Attorney, Agent, or Firm* — Middleton Reutlinger (57) ABSTRACT

An apparatus, method, and program product for optimizing a multiprocessor computing system by sampling memory reference latencies and adjusting components of the system in response thereto. During execution of processes the computing system, memory reference sampling of memory locations from shared memory of the computing system referenced in the executing processes is performed. Each sampled memory reference collected from sampling is associated with a latency and a physical memory location in the shared memory. Each sampled memory reference is analyzed to identify segments of memory locations in the shared memory corresponding to a sub-optimal latency, and based on the analyzed sampled memory references, the physical location of the one or more identified segments, the processor on which one or more processes referencing the identified segments, and/or a status associated with the one or more identified segments is dynamically adjusted to thereby optimize memory access for the multiprocessor computing system.

23 Claims, 4 Drawing Sheets

(56) References Cited

U.S. PATENT DOCUMENTS

| | | | | |
|---|---|---|---|---|
| 6,202,127 B1* | 3/2001 | Dean | ................... | G06F 11/3466 711/117 |
| 6,237,059 B1* | 5/2001 | Dean | ................... | G06F 9/4881 711/100 |
| 6,289,369 B1* | 9/2001 | Sundaresan | ............ | G06F 9/505 718/100 |
| 6,289,424 B1* | 9/2001 | Stevens | ................ | G06F 9/5016 711/147 |
| 6,332,178 B1* | 12/2001 | Dean | ................... | G06F 11/3447 702/179 |
| 6,442,585 B1* | 8/2002 | Dean | ................... | G06F 9/5016 717/127 |
| 6,701,421 B1 | 3/2004 | Elnozahy et al. | | |
| 6,769,017 B1 | 7/2004 | Bhat et al. | | |
| 6,782,410 B1* | 8/2004 | Bhagat | ................. | G06F 9/5027 709/201 |
| 6,799,241 B2* | 9/2004 | Kahn | ................. | G06F 12/0215 711/105 |
| 6,912,625 B2* | 6/2005 | Foster | ................... | G06F 9/5016 711/153 |
| 7,383,396 B2 | 6/2008 | Wyman | | |
| 7,584,332 B2* | 9/2009 | Kogge | ................. | G06F 9/4843 711/147 |
| 7,673,114 B2* | 3/2010 | Allen | ................... | G06F 9/5033 711/173 |
| 7,721,047 B2 | 5/2010 | Dunshea et al. | | |
| 7,895,596 B2* | 2/2011 | Kelly | ................... | G06F 9/5033 718/102 |
| 8,037,280 B2* | 10/2011 | Pandey | ................ | G06F 9/4856 709/232 |
| 8,392,661 B1* | 3/2013 | Metcalf | ................... | G06F 15/16 711/133 |
| 2002/0184290 A1* | 12/2002 | Olszewski | ............ | G06F 9/5077 718/102 |
| 2004/0049672 A1* | 3/2004 | Nollet | ................. | G06F 15/7867 713/100 |
| 2004/0054857 A1* | 3/2004 | Nowshadi | ............ | G06F 9/5011 711/153 |
| 2004/0139287 A1 | 7/2004 | Foster et al. | | |
| 2005/0210468 A1* | 9/2005 | Chung | ................. | G06F 9/4843 718/100 |
| 2007/0198785 A1* | 8/2007 | Kogge | ................. | G06F 9/4843 711/154 |
| 2007/0220195 A1* | 9/2007 | Kawaguchi | ............ | G06F 12/06 711/5 |
| 2008/0052721 A1* | 2/2008 | Rangarajan | ........... | G06F 9/5016 718/105 |
| 2008/0250213 A1* | 10/2008 | Holt | ........................ | G06F 9/526 711/159 |
| 2008/0270454 A1* | 10/2008 | Davis | ................... | G06F 9/5016 |
| 2009/0307439 A1* | 12/2009 | Jacobs | ............... | G06F 11/0712 711/153 |
| 2010/0278086 A1* | 11/2010 | Pochiraju | ............. | H04W 28/20 370/310 |
| 2011/0088038 A1* | 4/2011 | Kruglick | ................... | G06F 9/54 718/104 |
| 2011/0173622 A1* | 7/2011 | Shin | ...................... | G06F 9/4856 718/102 |
| 2011/0258420 A1* | 10/2011 | Devadas | ............... | G06F 9/3824 712/225 |
| 2012/0066688 A1* | 3/2012 | Chiang | ................. | G06F 9/5083 718/105 |
| 2012/0198187 A1* | 8/2012 | Accapadi | ............. | G06F 9/5016 711/160 |

OTHER PUBLICATIONS

Written Opinion of the International Searching Authority for Application No. PCT/JP2012/006910, Jan. 29, 2013.

International Search Report for Application No. PCT/JP2012/006910, Jan. 29, 2013.

* cited by examiner

DYNAMIC PROCESS/OBJECT SCOPED MEMORY AFFINITY ADJUSTER

FIELD OF THE INVENTION

The present invention relates to computing systems, and more particularly to evaluating and reducing latency in a multi-processor computing system.

BACKGROUND OF THE INVENTION

Computer technology continues to advance at a remarkable pace, with numerous improvements being made to the performance of both processing units—the "brains" of a computing system—and the memory that stores the data processed by a computing system.

In general, a processing unit ("CPU") is a microprocessor or other integrated circuit that operates by executing a sequence of instructions that form a computer program. The instructions are typically stored in a memory system having a plurality of storage locations identified by unique memory addresses. The memory addresses collectively define a "memory address space," representing an addressable range of memory regions that can be accessed by a microprocessor.

Parallel processing computing systems often include a plurality of nodes, where each node includes at least one CPU, and the plurality of nodes are interconnected, such that the computing nodes may transmit and receive data therebetween and also access memory connected to various nodes in the system. In a computing system with a plurality of CPUs and/or a plurality of nodes, a non-uniform memory access ("NUMA") configuration may be utilized to effectively distribute the main memory across multiple computing nodes. In a typical NUMA configuration at least one CPU, one or more CPU caches, and a portion of the main memory (e.g., a set of dynamic random access ("DRAM") memory devices) are connected to a memory bus to form a node. Typically, a plurality of nodes are connected by means of a high speed interconnect to form a NUMA configuration. The portion of the main memory resident on the same node as a CPU is typically considered to be the "local memory" for the CPU, while portions of main memory resident on other nodes are typically referred to as "remote memories" relative to the CPU. In a computer system with a NUMA configuration (a "NUMA system"), a data access by the a CPU that is satisfied by the contents of a local CPU cache or a local memory is referred to as a "local node" access. Accordingly, a "remote node" access is typically an access satisfied by accessing data that is stored on a remote node. Data accesses to remote nodes are associated with a very high latency as compared to local node accesses.

Typically, when a process is executed in a NUMA system the CPU executing the process accesses one or more memory locations to retrieve data required by the process. In NUMA systems the process typically executes faster if it is configured to perform the operations on a node with the data required for operation in a local memory. Likewise, a process executed in a NUMA system may execute slower if the process is configured to perform the task on a local node with the data required for operation in a remote memory due to the increased latency associated with accessing the remote node. Moreover, in highly distributed NUMA systems (i.e., NUMA systems with large amounts of interconnected nodes), latency associated with a node remotely accessing a first memory in a first remote node may differ as compared to the latency associated with remotely accessing a second memory in a second remote node due to transmission path length between the node and the respective remote nodes, the system resources configured on each respective remote node, the processes executing on each remote node at the time of remote access, other processes also attempting to remotely access each node at the time of remote access, and/or other such reasons.

As such, in distributed systems, including for example NUMA systems, not all remote memory locations have equal latency for all processors. In point of fact, physical and virtual locations of each processor in a particular node will create differences in efficient access to different areas in memory, including transferring data between caches associated with a specific processor or node. If two processors attempting to negotiate significant operations on memory segments are relatively "distant," the operations by which they share and access these segments may be significantly less efficient.

Consequently, a need continues to exist for optimizing performance of a shared memory computer system that reduces memory access latency in existing systems.

SUMMARY OF THE INVENTION

Embodiments of the invention provide an apparatus, method and program product to dynamically optimize memory accesses in a multiprocessor computing system. In some embodiments consistent with the invention, during execution of one or more processes by one or more processors of the computing system, memory reference sampling of memory locations from a shared memory of the computing system is performed, where a plurality of memory references are collected, and each memory reference collected during the sampling is associated with a latency and a location of a respective memory in the shared memory. The sampled memory references are analyzed to identify one or more segments of one or more memory locations in the shared memory associated with a sub-optimal latency. Based upon the analyzed memory references, a physical location of the one or more identified segments, a physical processor upon which at least one of the processes executes, and/or a status associated with the one or more identified segments is dynamically adjusted. In some embodiments, analyzing the sampled memory references includes scoring each memory reference based upon the time required to retrieve the respective segments of memory locations.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

It should be understood that the appended drawings are not necessarily to scale, presenting a somewhat simplified representation of various preferred features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments may have been enlarged or distorted relative to others to facilitate visualization and clear understanding.

DETAILED DESCRIPTION

In computing systems consistent with embodiments of the invention, the computing architecture supports a low-performance-overhead sampling of memory locations being referenced. Embodiments of the invention utilize the sampling, to determine per-process and per-page affinity scoring to dynamically move memory pages to a more efficient memory location in a node or processes to a more efficient CPU in a node to reduce affinity latency, where the node in which the memory page is stored or the process is executed may be considered the "home" node of the memory page or process.

In some embodiments, memory reference sampling is performed on a memory location. In some embodiments, the memory sampling may be partition-wide and/or limited to a selected set of chosen processes. In addition, some sampling architectures may allow for the sampling to be limited to a set of objects as well. The sampled data may include the "real" CEC memory location of the page referenced. In embodiments consistent with the invention, the collected sampling data may be analyzed to determine a score associated with each sampled memory reference. Furthermore, the associated score for each sampled memory reference may be based at least in part on a computed and/or approximated latency corresponding to the sampled memory reference in relation to the CPU and/or node of the referencing process.

In embodiments consistent with the invention, the sampling data (i.e., the memory reference data) may be statistically analyzed to determine a memory reference associated with a score indicating a high latency in relation to all objects sampled, a subset of objects, all processes sampled, and/or a subset of processes. In addition, in some embodiments analyzing the sampling data may include identifying one or more processes comprising similar object references.

Furthermore, in some embodiments, based at least in part on the sampling data and/or associated scores, one or more processes may be identified that would benefit (e.g., execute more efficiently, faster, etc.) from using a common pool of memory, in systems including memory pools. In these embodiments, in response to determining that one or more processes may benefit from using a common pool of memory, the system may dynamically change the memory references of the one or more processes to reference the determined common pool of memory.

In some embodiments, based at least in part on the sampling data and/or associated scores, one or more processes may be identified that would benefit from using one or more identified CPUs and/or nodes. In response to determining that the one or more processes would benefit from using the one or more identified nodes for execution, embodiments of the invention may dynamically change the one or more processors on which the one or more processes execute. In these embodiments, determining whether one or more processes would benefit from using one or more nodes for execution may include identifying the one or more nodes from a plurality of nodes of a system on which to execute the processes based at least in part on the sampling data and/or associated scores.

Furthermore, in some embodiments, based at least in part on the sampling data and/or associated scores, one or more object pages associated with scores indicating high latency may be identified. In these embodiments, in response to identifying object pages associated with scores indicating a high latency, embodiments of the invention may dynamically move the object pages to more favorable (i.e., lower latency) memory locations. In these embodiments, prior to dynamically moving the one or more object pages, one or more favorable memory locations may be determined based at least in part on a score associated with the memory location.

Additionally, in some embodiments, based at least in part on the sampling data and/or associated scores, a highly referenced object page may be identified (i.e., an object page referenced by a plurality of processes). In these embodiments, based at least in part on the sampling data and/or associated scores, a more favorable memory location for the highly referenced object page may be determined, and the highly referenced object page may be dynamically moved to the more favorable memory location. Moreover, in some embodiments, in response to moving the highly referenced object page to a more favorable memory location, an attribute associated with the highly referenced object page may be set such that the highly referenced object page may not be moved from the more favorable memory location, or such that moving the highly referenced object page from the more favorable memory location may be restricted.

Embodiments of the invention collect profiled memory reference data (i.e., sampling data) for one or more processes. In some embodiments, the memory reference data includes an identifier corresponding to a respective process, a virtual address of each memory object referenced by a respective process, and/or a memory and/or node identifier corresponding to a physical memory location of each referenced memory object. A computing system consistent with embodiments of the invention may analyze each memory object referenced by a respective process and determine a score associated with the referenced object in relation to the respective process. The determined score may be based at least in part on a determined and/or approximated latency of the referenced object in relation to the respective process. The computing system may analyze the score and/or memory reference data to determine if the respective process would execute better (e.g., more efficiently, faster, etc.) on a different CPU and/or node than the CPU/node upon which the respective process is currently executing. In response to determining that the respective process would execute better on a different CPU/node, the computing system may dynamically move the respective process to the different CPU/node for execution thereby.

Embodiments of the invention collect profiled memory reference data for one or more processes. A computing system consistent with embodiments of the invention may analyze one or more memory object references by one or more processes and determine a score associated with the one or more referenced objects in relation to the processes. The computing system may analyze the scores and/or referenced objects to determine one or more memory objects commonly referenced by a plurality of processes. The computing system may generate report data indicating which processes are referencing the commonly referenced objects. The generated report data may be utilized by the computing system to schedule processes sharing the commonly referenced objects to run concurrently and/or back-to-back. In these embodiments, such scheduling may reduce latency of one or more processes and the commonly referenced objects, reduce the likelihood of secondary storage paging (I/O) actions and/or latency, increase, and/or may lead to more efficient execution of one or more of the processes. Moreover, in some embodiments, the reporting data may be analyzed by the computing system to identify one or more memory objects of the commonly referenced objects that may be moved to a different memory location to thereby reduce latency associated with the one or more commonly referenced memory objects in relation to the one or more processes. Furthermore, in some embodiments, the reporting data may be analyzed by the computing system to adjust data associated with one or more processes, such that the processes preferentially reference one or more memory objects during execution.

Embodiments of the invention provide an apparatus, method, and program product for dynamically optimizing memory accesses in a multiprocessor computing system by performing memory reference sampling of memory locations from a shared memory being referenced by a plurality of processes executed by a plurality of physical processes. Each of a plurality of sampled memory references collected during memory reference sampling is associated with a latency and a physical location in the shared memory. The sampled memory references collected during memory reference sampling are then analyzed to identify at least one segment of memory locations in the shared memory with sub-optimal latency. Based upon the analysis, the system adjusts a physical location of the identified segment in the shared memory, a physical processor upon which at least one process that references memory locations in the identified segment executes, and/or a status associated with the identified segment.

In some embodiments of the invention, the latencies are scored based upon the time required to retrieve the respective segments of memory locations. The time may be measured or it may be approximated. The identified segment or segments may be identified based upon latency scores.

In some embodiments of the invention, the identified segment is a cache line associated with a cache page. The method may involve adjusting a location of at least a portion of the cache page such that a future latency associated with a future retrieval of the portion of the cache page is reduced. This may involve transferring the portion of the cache page from a first cache to a second cache or from a first node to a second node. The cache page may further include at least two cache lines.

In another embodiment of the invention, a cache page is identified with the memory segment, as is a location of execution of an object associated with the segment. The location of the object is adjusted such that a future latency associated with a future retrieval of at least a portion of the cache page by the object is reduced. In one particular embodiment, the object is at least a portion of a process executed by the computing system.

Some embodiments of the invention involve transferring at least a portion of a process that references memory locations in the identified segment from a first processing unit to a second processing unit.

Other embodiments involve transferring at least a portion of a process that references memory locations in the identified segment from a first node to a second node.

Still others include identifying both a first cache page associated with the identified segment and a second cache page associated with a subset of the memory requests for the plurality of segments of memory locations, then assigning an "enhanced status" to the second cache page that indicates that a transfer of the second cache page requires at least one more step than a transfer of the first cache page.

Hardware and Software Environment

Figure 1:
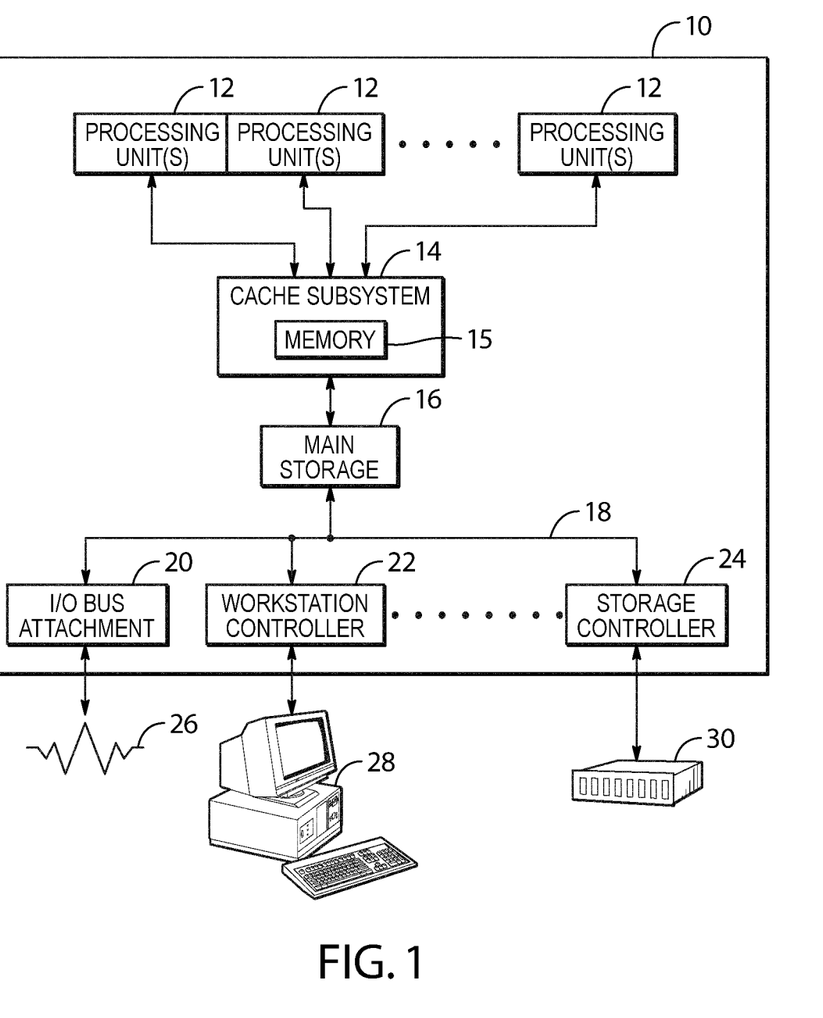
FIG. 1 is a block diagram of a shared memory computing system consistent with embodiments of the invention.

Turning more particularly to the drawings, wherein like numbers denote like parts throughout the several views, FIG. 1 is a block diagram of a shared memory computing system 10 consistent with embodiments of the invention. Shared memory computing system 10, in specific embodiments, may be a computer, computer system, computing device, server, disk array, or programmable device such as a multi-user computer, a single-user computer, a handheld device, a networked device (including a computer in a cluster configuration), a mobile phone, a video game console (or other gaming system), etc. Shared memory computing system 10 may be referred to as "computing system," but will be referred to as "computer" for the sake of brevity. One suitable implementation of computer 10 may be a multi-user computer, such as a computer available from International Business Machines Corporation ("IBM") of Armonk, N.Y.

Computer 10 generally includes one or more processing units 12 coupled to a memory subsystem that may further include a cache subsystem 14, memory 15, and main storage 16. The cache subsystem 14 may be comprised of dynamic random access memory ("DRAM"), static random access memory ("SRAM"), flash memory, and/or another digital or solid state storage medium that typically comprises one or more levels of data, instruction and/or combination caches, with certain caches serving the processing units 12 in a shared manner as is well known in the art. In specific embodiments, the cache subsystem 14 includes the shared memory 15 (e.g., such as, for example, a level-three ["L3"] cache and/or a level-four ["L4"] cache) and/or other digital storage memory that may be shared between the processing units 12 of the node as is well known in the art. The main storage 16 may comprise a hard disk drive and/or another digital storage medium. Moreover, as will be discussed below, each processing unit 12 may include at least one processing core and at least one level of dedicated cache memory.

Main storage 16 may be coupled to a number of external devices (e.g., I/O devices) via a system bus 18 and a plurality of interface devices, e.g., an input/output bus attachment interface 20, a workstation controller 22, and/or a storage controller 24, which respectively provide external access to one or more external networks 26, one or more workstations 28, and/or one or more storage devices such as a direct access storage device ("DASD") 30. System bus 18 may also be coupled to a user input (not shown) operable by a user of computer 10 to enter data (e.g., the user input may include a mouse, a keyboard, etc.) and a display (not shown) operable to display data from the computer 10 (e.g., the display may be a CRT monitor, an LCD display panel, etc.). Computer 10 may also be configured as a member of a distributed computing environment and communicate with other members of that distributed computing environment through network 26.

The computer 10 includes at least one memory requester to request a cache line that is serviced by a common cache memory (e.g., the cache subsystem 14 and/or cache memory of at least one processing unit 12) as is well known in the art. For example, the computer 10 of FIG. 1 may include one or more processing unit 12 serviced by a common cache memory, while each processing unit 12 may include one or more memory requesters serviced by a common cache memory (e.g., the cache subsystem 14, main storage 16, and/or memory internal to the processing unit 12). In specific embodiments, the requesters in computer 10 may include at least one processing unit 12, a component of a processing unit 12 (e.g., a level-one cache, a level-two cache, an I/O controller, or other component of a processing unit 12 as described below), and/or a core of a processing unit 12 (as well as a hardware thread of a core).

Figure 2:
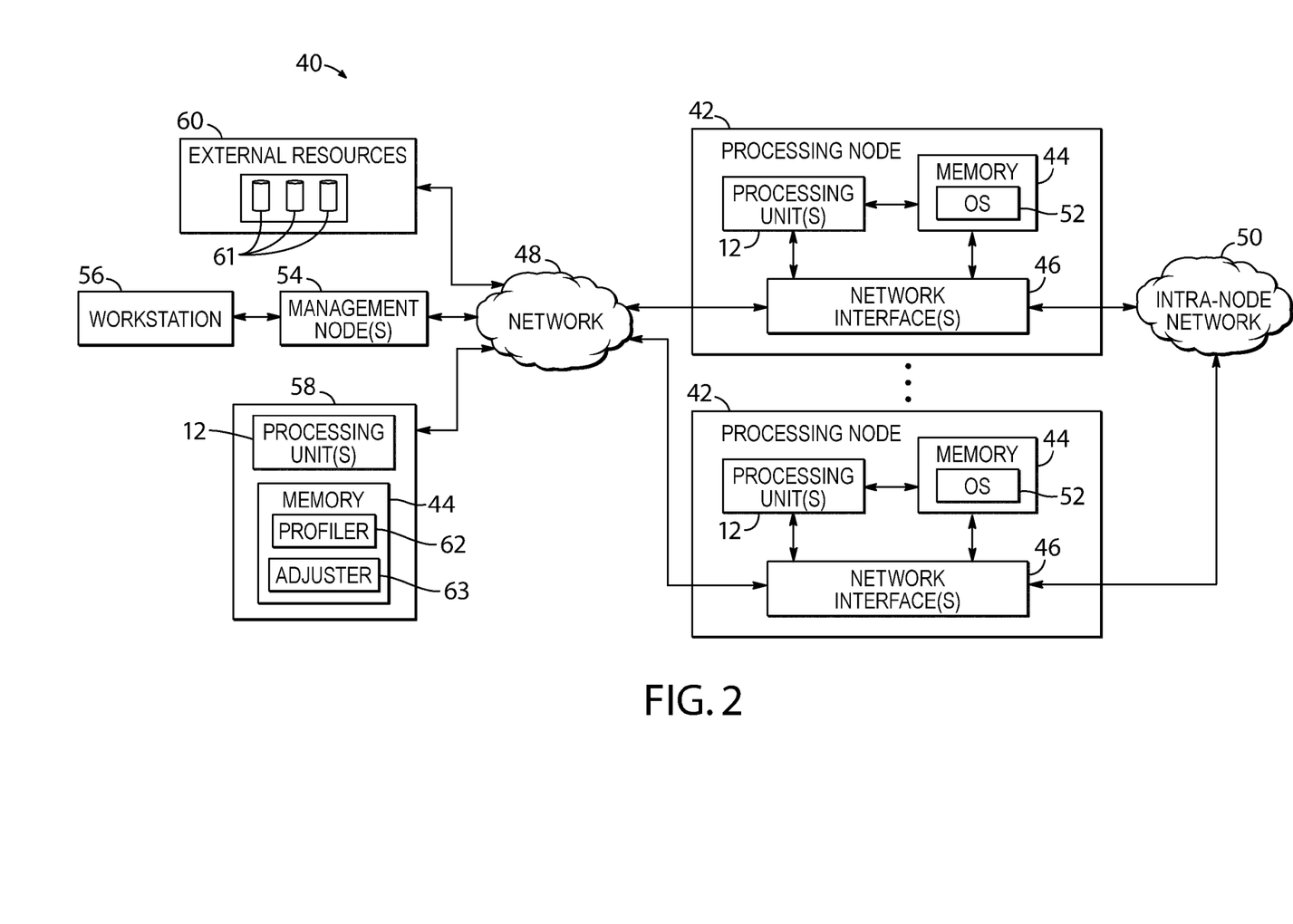
FIG. 2 is a block diagram of a shared memory computing system consistent with alternative embodiments of the invention.

Computer 10 is merely representative of one suitable environment for use with embodiments of the invention, and embodiments of the invention may be utilized in various other alternative environments. For example, FIG. 2 is a block diagram of an alternative shared memory computing system 40 consistent with embodiments of the invention. The alternative shared memory computing system 40, hereinafter "system" 40, may include a plurality of processing nodes 42 that each include at least one processing unit 12, a memory 44, and a network interface 46. The network interface 46, in turn, may communicate with at least one network 48, 50, and in particular the network interface 46 may be configured to communicate with at least one inter-node network 50 dedicated to communication between the processing nodes 42. Each processing node 42 may be configured with an operating system 52 and application (not shown). In typical embodiments, each of the processing nodes 42 is configured to receive and process at least one task with the application, and thus the processing nodes 42, collectively, are configured to perform the bulk of the work of the system 40. In some embodiments, however, some processing nodes 42 may be configured as dedicated I/O nodes and thus maintain an interface between a subset, or "group," of processing nodes 42 and the network(s) 48, 50. Moreover, I/O nodes may be operable to perform process authentication and authorization, task accounting, debugging, troubleshooting, booting, and configuration operations as is well known in the art. Thus, the total work for a group of processing nodes 42 may be simplified and additional burdens on each of the group of processing nodes 42 that would be presented by interfacing with the entirety of the processing nodes 42 and the rest of the system 40 are avoided. Each processing node 42 may include more than one processing unit 12, and, in specific embodiments, each node may include two or four processing units 12 as is well known in the art.

The system 40 may include one or more management nodes 54 that may store compilers, linkers, loaders, and other programs to interact with the system 40. The management nodes 54 may be accessed by a user at a workstation 56 controlled by at least one management node 54. Thus, the user may submit one or more programs for compiling, tasks for execution, execution contexts, workloads, parts of a workload, or jobs to one or more service nodes 58 of the system 40. The management nodes 54 may each include at least one processing unit and a memory in a similar manner to that of the processing nodes 42 to perform auxiliary functions which, for reasons of efficiency or otherwise, may be best performed outside the processing nodes 42 or service nodes 58. For example, interactive data input, software code editing, software code compiling, and/or other user interface functions may be handled by the management nodes 54.

The service nodes 58 may include databases and administrative tools for the system 40. The databases may maintain state information for the processing nodes 42, including the current scheduling of tasks across the processing nodes 42, while the administrative tools may control the scheduling and loading of programs, tasks, data, and jobs onto the processing nodes 42, including loading programs, tasks, data, and jobs onto each processing unit 12 of each processing node 42. As such, the service nodes 58 may, in some embodiments, gather a group of processing nodes 42 from the plurality of processing nodes 42 and dispatch at least one task, job, application, part of a workload, execution context, or program to the group of compute nodes 12 for execution. Hereinafter, the at least one task, job, workload, part of a workload, execution context, or program will be referred to as a "task" for the sake of brevity. A task may be communicated across the network 48 and/or 50 and through the I/O nodes to a processing node 42 to be processed. The functionality of the management nodes 54 and/or service nodes 58 may be combined in a control subsystem operable to receive, manage, schedule, redistribute, and otherwise control jobs for the processing nodes 42.

Management nodes 54 and/or service nodes 58 may each include a group of processing nodes 42 and at least one I/O node. In this way, management nodes 54 and/or service nodes 58 may be internally connected to the processing nodes 42 through the inter-node network 50 as well as network 48. Alternately, management nodes 54 and/or service nodes 58 may each include of a group of processing nodes 42 and at least one I/O node separate from the processing nodes 42 (i.e., the management nodes 54 and/or service nodes 58 may be configured as "stand-alone" nodes). Furthermore, management nodes 54 and/or service nodes 58 may each include one processing node 42. One or more external resource servers 60 may be servers accessible over the network 48 and configured to provide interfaces to various data storage devices, such as, for example, hard disk drives 61, optical drives (e.g., CD ROM drives, CD R/RW drives, DVD+/−R/RW drives, Blu-Ray drives, holographic storage drives, etc.), solid state memory drives, or other I/O devices, resources, or components that may be accessed for data and/or to process a task.

In a similar manner as the computer 10, the memory 44 of each processing node 42 may include a cache subsystem comprised of DRAM, SRAM, flash memory, and/or another digital or solid state storage medium. Additionally, the memory 44 of each processing node 42 may further comprise a main storage that comprises a hard disk drive and/or another digital storage medium. Also similarly, the cache subsystem may comprise one or more levels of data, instruction and/or combination caches, with certain caches serving the processing units 12 in a shared manner as is well known in the art.

A node, whether configured as a processing node 42, I/O node, management node 54, or service node 58, is a portion of the system 40 that includes one or more requesters for cache lines and is serviced by a common cache memory (e.g., the memory 44 or a cache memory internal to at least one processing unit 12 of the node 42) as is well known in the art. In specific embodiments, the requesters in the system 40 may include a processing node 42 (hereinafter, "node" 42), a memory 44 of a node, at least one processing unit 12, a component of a processing unit 12 (e.g., a cache and/or I/O controller as disclosed below), and/or a core of a processing unit 12 (as well as a hardware thread of a core). In specific embodiments each node 42 may be configured to process a workload and/or one or more tasks and cooperate with the other nodes 42 through the respective network interfaces 46 to process a workload and/or the one or more tasks in a parallel fashion as is well known in the art. Although one network interface 46 is shown in FIG. 2, each node 42 may include a plurality of network interfaces 46 or other network connections. As such, each node 42 may be configured to communicate to the system 40 or other nodes 42 through various networks, including the intra-node network 50. For example, each node 42 may communicate to every other node 42 through a torus network. Moreover, various nodes 42 may be custom configured to perform various functions. For example, some nodes 42 of the system 40 may be configured as computing nodes (e.g., to receive a workload and/or at least one task and process that workload and/or at least one task), I/O nodes (e.g., to manage the communications to and/or from each computing node and the rest of the system 40), management nodes (e.g., to manage the system 40 and receive a workload and/or at least one task), and/or service nodes (e.g., to monitor the system 40, schedule a workload, and/or support the nodes 42). As such, and in some embodiments, the system 40 may have an architecture consistent with a Power System shared computing system as distributed by IBM. In alternative embodiments, the system 40 may have an architecture consistent with a BlueGene parallel computing system architecture as developed by IBM. In alternative embodiments, the system 40 may have an architecture consistent with a RoadRunner parallel computing system architecture as also developed by IBM. Moreover, and in other alternative embodiments, the system 40 may have an architecture consistent with a non-uniform memory access ("NUMA") and/or a cache coherent NUMA ("ccNUMA") computing system as is well known in the art. Nodes may be defined at a number of different levels in a multi-level shared memory architecture, and in some embodiments need not be distinguished from one another based upon any particular physical allocation or demarcation. Indeed, in some embodiments multiple nodes may be physically disposed in the same computer, on the same card, or even on the same integrated circuit.

As illustrated through FIG. 1 and FIG. 2, computer 10 and each node 42 may include one or more processing units 12. During operation, various instructions and/or data organized into cache lines may be used to process a task. In some embodiments, the cache lines are portions of data of a memory region of the computer 10 and/or system 40. In shared memory computing systems (e.g., computer 10 and/or system 40), shared data in the cache lines, and thus, by extension, the cache lines themselves, may be read, modified, and/or released by synchronization operations, including synchronization operations that lock data in the cache lines to update such data, as well as synchronization operations that atomically update data in the cache lines (for the sake of brevity, and unless otherwise specified, it will be understood that a reference to a "cache line" throughout the subject disclosure may refer to all or simply a subset of the data of the cache line).

In specific embodiments, a cache line is locked by setting a lock variable of the cache line to set value. When a critical section associated with that cache line is complete, the lock variable of that cache line is reverted to its original state (e.g., a clear value) and other requesters may contend to acquire a lock on that cache line. Thus, and in specific embodiments, an acquire operation and a release operation are paired to at least respectively lock and unlock a cache line during a critical section of execution.

Figure 3:
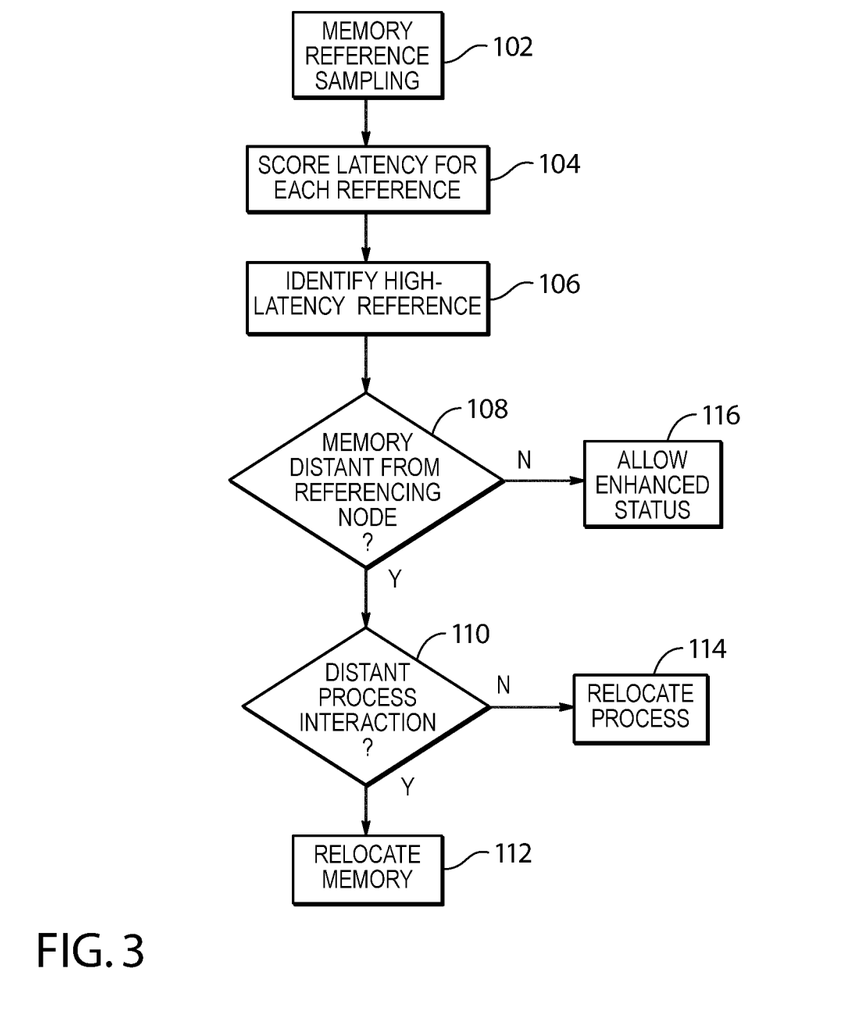
FIG. 3 is a flowchart illustrating one embodiment of a logic flow that may occur in an optimization affinity adjuster consistent with an embodiment of the invention.

Furthermore, in some embodiments, the system may include a profiler that engages in sampling. As shown in FIG. 2, the service node 58 may include one or more processing units 12 and a memory 44, where the memory 44 of the service node 58 may include program code related to a profiler 62 stored thereon consistent with some embodiments of the invention. An adjuster in accordance with the present invention may operate in conjunction with an existing sampling profiler to carry out memory reference sampling, providing sufficient data to identify high-latency memory references. For example, referring to FIG. 2, the service node 58 may include program code related to an adjuster 63 stored thereon consistent with some embodiments of the invention. As such, in some embodiments, the one or more processing units 12 of service node 58 may execute the profiler 62 and/or adjuster 63 such that the processing units of the service node 58 perform steps consistent with embodiments of the invention. While in FIG. 2, profiler 62 and adjuster 63 are illustrated as program code including operations that may be executed by the processing units 12 to perform steps consistent with embodiments of the invention, the invention is not so limited. For example, in some embodiments, profiler 62 and/or adjuster may comprise one or more special purpose processors configured to perform steps consistent with embodiments of the invention, where the special purpose processors may be associated with the service node 58 and/or may be associated with one or more devices connected to network 48, including for example management node 54, external resources 60, processing nodes 42, and/or workstation 56. The adjuster may carry out a process of analysis and system adjustment as shown in the flowchart of FIG. 3.

Memory reference sampling (block 102) may be carried out in accordance with a memory profiler. For example, IBM's POWER architecture includes memory reference sampling as a low-overhead diagnostic. The profiler and adjuster may run on service nodes 58 as described above with respect to the multi-node system 40. Each reference sample includes information regarding the memory referenced and the process calling the reference. This information may include memory affinity data for the cache page associated with the reference, the physical location of the memory segment referenced, and the processing unit and node associated with the referencing process.

Each memory reference can be assigned a score representing the latency associated with the reference (block 104). Methods for scoring latency are well-known in the art. Factors that can contribute to high latency include critical section conflicts arising from delays in accessing locked memory, cache misses when data is not found in the fastest caches, and non-local memory calls where data is located in a memory region associated with a processor or node from which is distant from the referencing process. The latency score for each memory reference may represent either calculated or approximated latency.

The affinity adjuster acts to address a problem when a reference is identified as having high latency (block 106). Each score when generated may be immediately evaluated to against a threshold to identify a high-latency reference; alternatively, high-latency references may be searched out and identified at intervals during sampling. The identified score may reflect a single sample score or may reflect the analysis of multiple samples. For example, a single sample with the highest score may be identified. Alternatively, analyzing the samples may return a memory segment, for example a cache line or cache page, with a high mean or median latency over several references. In another embodiment, a frequency threshold may be set such that only a certain absolute number of high-latency samples for the same memory segment, or alternatively a certain ratio of high-latency samples to total samples involving the segment, may cause the identification of a reference involving a given memory segment.

One of ordinary skill in the art will understand that improving system efficiency by reducing latency requires a statistical approach, as occasional high-latency references are usually inevitable and do not significantly impact system performance. In addition, the adjustments described herein and explained further below may themselves be a drain on performance if implemented with too little justification. However, when a pattern of high-latency references emerges as can be located through a memory reference sampling process as described above, adjustment may reduce latency. Therefore, in evaluating a high-latency reference, the description below assumes that sufficient memory reference sampling has occurred so that the terms "frequent" and "recurring" having meaningful definitions. Nonetheless, one of ordinary skill in the art will recognize that the steps outlined herein could be carried out in a multiprocessor computing system even with very sparse sampling, but with a greater possibility of error.

Once a high-latency reference is identified, additional analysis is performed on the associated memory segment to determine an appropriate adjustment. In one embodiment, the associated memory segment is considered to be the cache page associated with the referenced cache line. Alternatively, the memory segment may simply be the cache line itself. The adjuster evaluates the affinity of the memory segment along with the location of the referencing process to determine whether the referencing process is local or non-local (block 108). The definition of a local versus a non-local reference (i.e., referencing process) may be defined for a given system; where memory caches are specific to nodes, a local reference may be one where the process and memory segment are located on the same node. Other multi-processor systems with latency as a factor of the relative locations between a processor and a memory cache may have other definitions of "local" or "distant".

If the reference was non-local ("Yes" branch of decision block 108), then it may be appropriate to adjust the location of the memory segment so that references from the identified process to the identified segment are local references. However, where resources are shared, adjusting the memory affinity may not reduce total system latency. For example, if the sampling shows frequent memory references associated with two processes running on different nodes, relocating the memory segment associated with the references may decrease latency with regard to references by one process at the cost of an unacceptable increase in latency with regard to other processes that reference the same segment. In this situation, hosting the different processes on processors associated with the same node may reduce latency. Therefore, when two or more processes are both heavily associated with the same memory segment, placing those processes in proximity to each other as well as to the memory segment may adequately address the identified latency problem.

This is represented by evaluating to see if distant processes are frequently accessing the identified memory segment (block 110). If the process identified with the high-latency non-local memory reference does not significantly share the memory with other distant processes ("No" branch of decision block 110), then the memory segment is affinitized with the identified process (block 112). This may involve transferring the memory segment, and other associated memory segments if appropriate, to a cache that is considered local to the processor upon which the identified process runs. If appropriate, the cache page associated with the identified memory segment may be transferred to the local cache memory in the node where the process runs. As noted above, other definitions of local may prompt other sorts of affinity adjustments as understood with regard to different system architectures.

If one or more processes other than the process identified with the high-latency non-local memory reference also represent significant traffic for the identified memory segment ("Yes" branch of decision block 110), then it may be appropriate to transfer one or more of the processes (block 114) rather than transferring the memory segment. By consolidating processes associated with long latency times onto the same node or otherwise in proximity, it may be possible to reduce latency as those processes reference the same memory segment. Transferring a process may require altering the affinity of other memory segments which are closely connected to the process so that these related segments are also relocated. One of ordinary skill will understand that the costs to the system of relocating one or more processes onto processors in order to group processors in proximity are quantifiable. In one embodiment, the projected reduction in latency can be balanced against the calculated costs of transfer prior to relocating the process (block 114).

A different adjustment may address high latency in cases where the identified references were local ("No" branch of decision block 108). Total latency may be reduced by significantly privileging one process over others for access to a shared resource (block 116). For example, the normal custody negotiation between resources uses the typical "Locked" and "Shared" statuses as described above such that the earliest reference to a memory segment is honored, and the segment's status changed to reflect that process. However, where the sampling indicates that doing so is inefficient, an additional status may be introduced such that, when implemented, an additional step is required for another processor to transfer and lock the resource.

Figure 4:
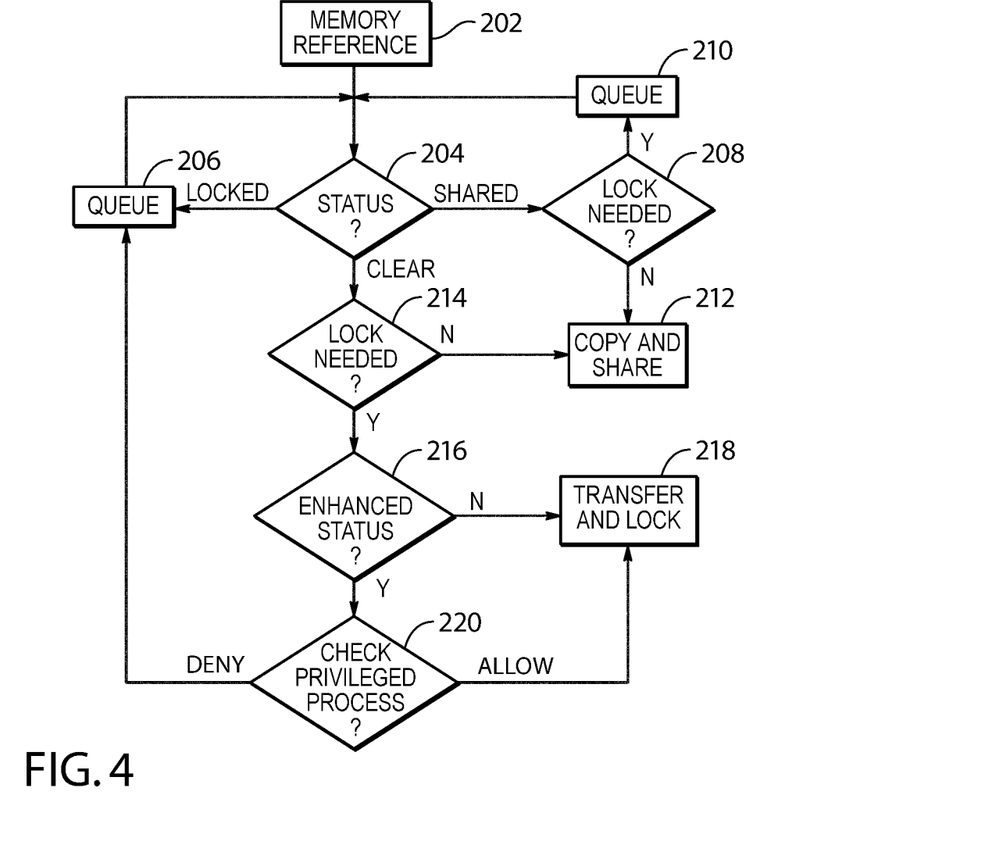
FIG. 4 is a flowchart illustrating a sequence of operations consistent with embodiments of the invention that may be executed by the computing system of FIG. 1 to access a memory reference.

The flowchart of FIG. 4 demonstrates a set of steps associated with a memory reference which may include enhanced status. As shown, when a process references a memory segment such as a cache line (block 202), the status of the cache line determines the ability of the reference to use it (decision block 204). If the cache line shows as "Locked" ("Locked" branch of decision block 204), the reference is placed in a queue waiting for the reference to unlock (block 206). If the cache line shows as "Shared" ("Shared" branch of decision block 204) and the memory reference is limited to reading the data and so does not need a lock ("No" branch of decision block 208), then a copy of the data can be made and stored locally as another copy of the cache line with "Shared" status (block 212). On the other hand, if write access and therefore a lock on the data is required ("Yes" branch of decision block 208), then the reference must enter the queue and wait "Clear" status (block 210).

If the cache line shows as clear ("Clear" branch of decision block 204), then normally the data could be either copied and "Shared" ("No" branch of decision block 214, block 216) or transferred and "Locked" without additional evaluation. However, if the coherence protocol allows for enhanced status in accordance with one embodiment of the invention, then at least one additional step is necessary before data transfer can occur. As shown, the system checks to see if the cache line has enhanced status. If not ("No" branch of decision block 218), then the resource is transferred and locked as normal. If the cache line does have enhanced status ("Yes" branch of decision block 218), the status is associated with one or more processes.

A query is made regarding each of those processes to assure that the memory segment can be transferred. For example, if any of those processes is also associated with a queued reference regarding the memory segment, the query may deny the request to lock the resource ("DENY" branch of decision block 220), forcing the reference to requeue (block 206). Alternatively, if each of the queried processes no longer needs access to the memory segment, the query may allow the request to transfer and lock the resource). This enhanced status may allow one or more processes to jump to the top of any queue for memory segments for which they are privileged, or may allow what is essentially a "soft lock" during critical portions of their execution. Any similar procedure that adds at least one additional step to the process of transferring and locking a memory segment with enhanced status may be implemented in accordance with different multiprocessor computing systems.

Other modifications will be apparent to one of ordinary skill in the art. Therefore, the invention lies in the claims hereinafter appended.

What is claimed is:

1. A method of dynamically optimizing memory accesses in a multiprocessor computing system, the method comprising:
    during execution of a plurality of processes by a plurality of physical processors in the multiprocessor computing system, performing memory reference sampling of memory locations from a shared memory being referenced by the plurality of processes, wherein each of a plurality of sampled memory references collected during memory reference sampling is associated with a latency and a physical location in the shared memory;
    analyzing the sampled memory references collected during memory reference sampling to identify at least one segment of memory locations in the shared memory associated with at least one sub-optimal latency;
    dynamically adjusting, during execution of the plurality of processes and based upon the analyzed sampled memory references, a physical processor upon which a first process of the plurality of processes that references memory locations in the at least one identified segment executes, wherein dynamically adjusting the physical processor upon which the first process executes comprises:
        determining whether the first process is non-local to the at least one identified segment;
        determining if the first process shares the at least one identified segment with at least one distant process that executes on a different physical processor than the first process; and
        in response to determining that the first process is non-local to the at least one identified segment and that the first process shares the at least one identified segment with the at least one distant process, transferring the first process to the different physical processor to consolidate the first and second processes on the different physical processor and thereby reduce latency for the at least one identified segment.

2. The method of claim 1, wherein analyzing the sampled memory references includes:
    scoring each of the sampled memory references based upon a time required to retrieve respective segments of memory locations.

3. The method of claim 2, wherein scoring each of the sampled memory references based upon the time required to retrieve each of the plurality of segments of memory locations includes measuring the time required to retrieve each of the plurality of segments of memory location.

4. The method of claim 2, wherein scoring each of the sampled memory references based upon the time required to retrieve the respective segments of memory locations includes approximating the time required to retrieve each of the plurality of segments of memory locations.

5. The method of claim 2, wherein analyzing the sampled memory references collected during memory reference sampling to identify the at least one segment of memory locations in the shared memory associated with at least one sub-optimal latency is based at least in part on the scoring associated with each of the sampled memory references.

6. The method of claim 1, wherein the at least one identified segment is a cache line associated with a cache page.

7. The method of claim 6, further comprising:
    adjusting a location of at least a portion of the cache page such that a future latency associated with a future retrieval of the portion of the cache page is reduced.

8. The method of claim 7, further comprising:
    transferring the portion of the cache page from a first cache to a second cache.

9. The method of claim 7, further comprising:
    transferring the portion of the cache page from a first node to a second node.

10. The method of claim 6, wherein the cache line is a first cached line, and the cache page includes at least a second cache line.

11. The method of claim 1, further comprising:
    identifying a cache page associated with the at least one identified segment;
    identifying a location of execution of an object associated with the identified segment; and
    adjusting the location of the object such that a future latency associated with a future retrieval of at least a portion of the cache page by the object is reduced.

12. The method of claim 11, wherein the object is at least a portion of a process executed by the computing system.

13. The method of claim 1, further comprising:
    transferring at least a portion of a process that references memory locations in the at least one identified segment from a first node to a second node.

14. The method of claim 1, further comprising:
    identifying a first cache page associated with the at least one identified segment;
    identifying a second cache page associated with a subset of the memory requests for the plurality of segments of memory locations; and
    assigning a status to the second cache page that indicates that a transfer of the second cache page requires at least one more step than a transfer of the first cache page.

15. The method of claim 1, further comprising:
    analyzing a location of a respective process referencing a respective identified segment of the memory locations in the shared memory to determine whether the respective process is a local referencing process; and
    in response to determining that the respective process is a local referencing process, assigning an enhanced status to the respective process for the at least one identified segment of the memory locations in the shared memory.

16. A multiprocessor computing system, comprising:
    a plurality of physical processors; and program code configured to be executed by at least one physical processor to dynamically optimize memory accesses in the multiprocessor computing system, the program code further configured to, during execution of a plurality of processes by at least a subset of the plurality of physical processors, perform memory reference sampling of memory locations from a shared memory being referenced by the plurality of processes, wherein each of a plurality of sampled memory references collected during memory reference sampling is associated with a latency and a physical location in the shared memory; analyze the sampled memory references collected during memory reference sampling to identify at least one segment of memory locations in the shared memory associated with at least one suboptimal latency; and dynamically adjust, during execution of the plurality of processes and based upon the analyzed sampled memory references, a physical processor upon which a first process that references memory locations in the at least one identified segment executes, wherein dynamic adjustment of the physical processor upon which the first process executes comprises:

determining whether the first process is non-local to the at least one identified segment;

determining if the first process shares the at least one identified segment with at least one distant process that executes on a different physical processor than the first process; and in response to determining that the first process is non-local to the at least one identified segment and that the first process shares the at least one identified segment with the at least one distant process, transferring the first process to the different physical processor to consolidate the first and second processes on the different physical processor and thereby reduce latency for the at least one identified segment.

17. The computing system of claim 16, wherein the program code is further configured to score each of the plurality of latencies based upon a time required to retrieve the respective segments of memory locations.

18. The computing system of claim 17, wherein the program code is further configured to identify the at least one segment of memory locations by identifying a segment of memory locations based upon its score.

19. The computing system of claim 16, wherein the program code is further configured to transfer at least a portion of the first process from a first node to a second node.

20. The computing system of claim 16, wherein the program code is further configured to:

identify a first cache page associated with the at least one identified segment;

identify a second cache page associated with a subset of the memory requests for the plurality of segments of memory locations; and assign a status to the second cache page that indicates that a transfer of the second cache page requires at least one more step than a transfer of the first cache page.

21. A program product, comprising:

a non-transitory computer readable medium; and program code stored on the computer readable medium and configured to be executed by at least one processor of a multiprocessor computing system, the program code further configured to dynamically optimize memory accesses in the computing system by, during execution of a plurality of processes by at least a subset of the plurality of physical processors in the multiprocessor computing system, performing memory reference sampling of memory locations from a shared memory being referenced by the plurality of processes, wherein each of a plurality of sampled memory references collected during memory reference sampling is associated with a latency and a physical location in the shared memory; analyze the sampled memory references collected during memory reference sampling to identify at least one segment of memory locations in the shared memory associated with at least one suboptimal latency; and dynamically adjust, during execution of the plurality of processes and based upon the analyzed sampled memory references, a physical processor upon which at least one process that references memory locations in the identified segment executes, wherein dynamic adjustment of the physical processor upon which the first process executes comprises:

determining whether the first process is non-local to the at least one identified segment;

determining if the first process shares the at least one identified segment with at least one distant process that executes on a different physical processor than the first process; and in response to determining that the first process is non-local to the at least one identified segment and that the first process shares the at least one identified segment with the at least one distant process, transferring the first process to the different physical processor to consolidate the first and second processes on the different physical processor and thereby reduce latency for the at least one identified segment.

22. The method of claim 1, further comprising:

analyzing the sampled memory references collected during the memory reference sampling to identify the second process; and determining the second physical processor based on the second process.

23. The method of claim 1, wherein transferring the first process to the different physical processor further includes altering an affinity of at least one other segment of memory locations referenced by the first process to cause the at least one other segment of memory locations to be relocated along with the transfer of the first process to the different physical processor.

* * * * *